United States Patent

[11] 3,590,294

| [72] | Inventors | Junpei Inagaki;<br>Hiroyuki Kitamura; Hideo Sumitani, all of Yokohama-shi, Japan |
|---|---|---|
| [21] | Appl. No. | 854,473 |
| [22] | Filed | Sept. 2, 1969 |
| [45] | Patented | June 29, 1971 |
| [73] | Assignee | Tokyo Shibaura Denki Kabushiki Kaisha Ca.K.a. Tokyo Shibaura Electric Co., Ltd. Kanagawa-ken, Japan |
| [32] | Priority | Sept. 3, 1968, Sept. 16, 1968, Nov. 28, 1968 |
| [33] | | Japan |
| [31] | | 43/75885, 43/79448 and 43/86680 |

[54] SYNCHRONOUS MACHINE PROVIDED WITH COMB-SHAPED MAGNETIC POLES
4 Claims, 8 Drawing Figs.

| [52] | U.S. Cl. | 310/162, 310/263 |
|---|---|---|
| [51] | Int. Cl. | H02k 19/00 |
| [50] | Field of Search | 310/162, 168, 49, 177, 263, 52, 58 |

[56] References Cited
UNITED STATES PATENTS

| 1,594,058 | 7/1926 | Freiburghouse | 310/58 |
| 3,223,866 | 12/1965 | Tiltins | 310/263 |
| 3,309,547 | 3/1967 | Woodward | 310/263 |
| 3,319,100 | 5/1967 | Erickson | 310/263 |
| 3,346,749 | 10/1967 | Shafranek | 310/263 |

Primary Examiner—Milton O. Hirshfield
Assistant Examiner—R. Skudy
Attorneys—Robert E. Burns and Emmanuel J. Lobato ABSTRACT: Disclosed herein is a synchronous machine having a pair of opposite magnetic rotor members with interleaved poles of opposite polarities, wherein portions of the rotor members between adjacent poles are cut away, and the inner corners of each pole are also cut away to decrease leakage flux; and the diameter of portions of the poles outside the armature core are reduced to decrease armature leakage reactance.

SYNCHRONOUS MACHINE PROVIDED WITH COMB-SHAPED MAGNETIC POLES

BACKGROUND OF THE INVENTION

The present invention relates to improvements in a synchronous machine comprising a stator armature, and a rotor surrounded by said armature, said rotor comprising comb-shaped magnetic poles which are supported by two opposite magnetic pole yokes unified respectively with respective cylinders supported by a rotary shaft.

The synchronous machines as mentioned above can be effectively utilized as a generator for charging the battery of an automobile, a driving motor for an electric automobile, a stepping motor for a digitally controlled machine tool and the like, or as a DC brushless motor which comprises thyristors connected to the armature winding thereof and an angular position detecting device located at the end of the rotor shaft to control the on-off of said thyristors in a predetermined sequence responsive to angular position of the rotor of the motor. The rotor of the synchronous machine of the type referred to above comprises a pair of opposite magnetic members, each including a magnetic cylinder mounted on the rotor shaft, a plurality of axially projecting comb-shaped poles, a magnetic yoke interconnecting the cylinder and poles, and exciting means for magnetizing the poles. The structure is disposed to provide interleaved magnetic poles of alternate polarity, and in a compact design, the inner end of one of the yokes is located closely adjacent the radial inner surface of the poles of the other magnetic member thus increasing leakage flux between these portions. Further, the gap between inner corners of adjacent poles is also small whereby leakage between these portions is also excessive.

Furthermore, in the synchronous machine as mentioned above, it is necessary to make the axial length of the magnetic poles larger than the thickness of the laminated armature iron core for the reason of increasing the sectional area and the mechanical strength of each of the poles so that the coil ends of the armature winding are disposed near the axial end portions of magnetic poles, whereby leakage reactance is increased, thus impairing the operating characteristics of the machine.

On the other hand, the rotational speed of the above-mentioned synchronous machine is usually very high, for instance, about 20,000 r.p.m., so that a larger eddy current may be produced on the surface of the magnetic poles, whereby a large quantity of heat is produced and the temperature at said surface rises. In general, besides the eddy current as mentioned above, there are such various phenomena causing temperature rise of the machine as damper loss, eddy current loss on the rotor surface, bearing friction loss and the like. Accordingly, if the eddy current on the rotor surface is large, efficiency of the machine is decreased to about 80 percent.

The above-mentioned various disadvantages of the synchronous machine provided with comb-shaped magnetic poles have been eliminated or at least reduced extraordinarily according to the invention.

SUMMARY OF THE INVENTION

It is therefore an object of the invention to provide a synchronous machine provided with comb-shaped magnetic poles, in which leakage flux between adjacent magnetic poles, and between the magnetic poles and the inner end of the magnetic yoke is sufficiently decreased, thereby to increase the efficiency power, and performance of the machine.

It is another object of the invention to provide a synchronous machine provided with comb-shaped magnetic poles, in which leakage flux between the armature coil ends and the axial ends of magnetic poles is effectively suppressed, thereby to increase the machine performance.

The above objects, other objects of the invention and characteristic features and functions of the invention will be clearly understood by the following description taken in conjunction with the accompanying drawings in which the same or equivalent parts are indicated by same reference numerals and characters.

DETAILED DESCRIPTION OF THE INVENTION

Figure 1:
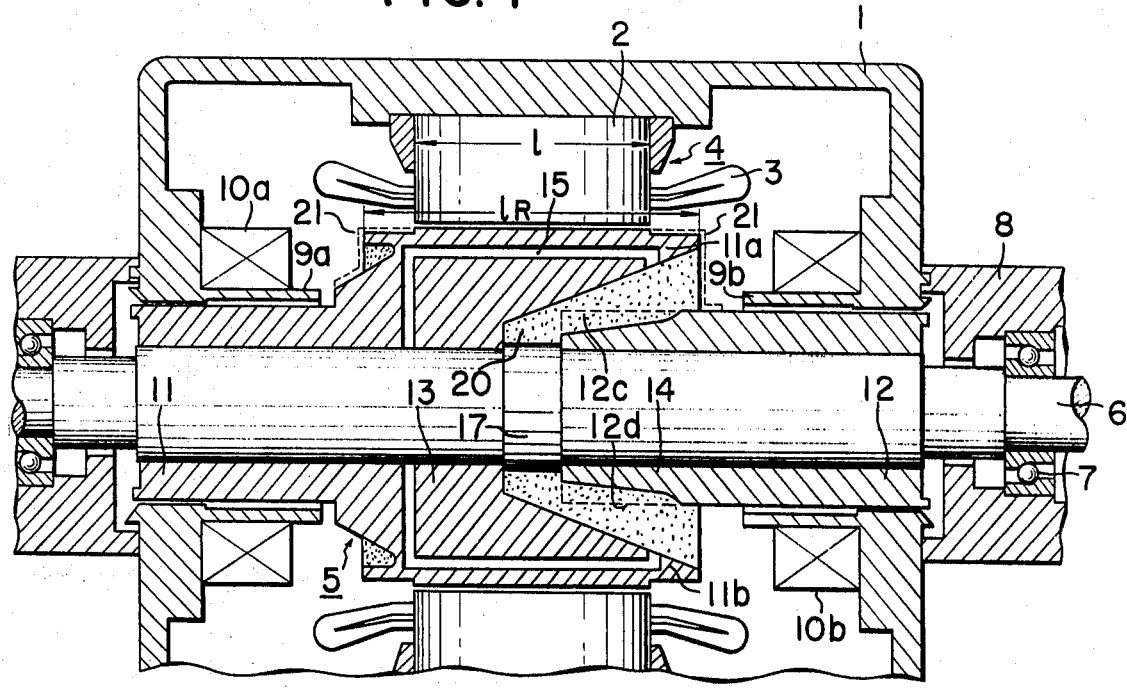
FIG. 1 is an elevational view, in vertical section of an example of the invention.
Figure 2A:
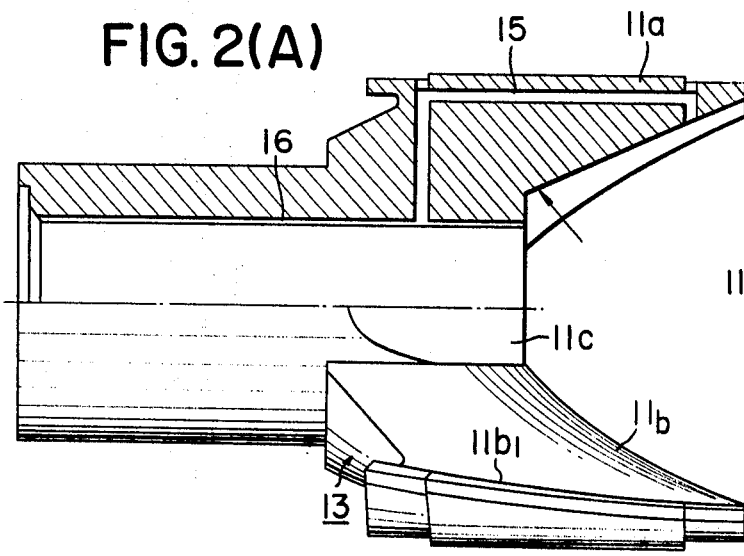
FIG. 2(A) is an enlarged view, partly in section, of one of parts of the rotor of the example illustrated in FIG. 1.
Figure 2B:
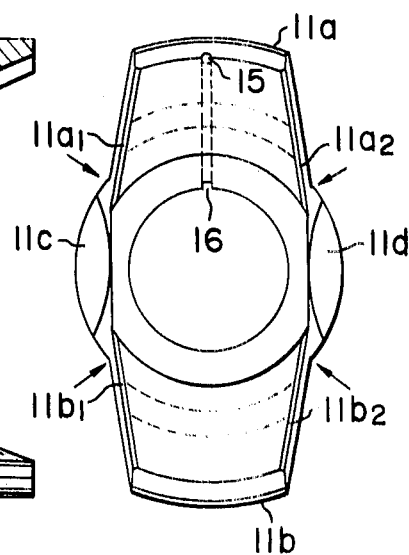
FIG. 2(B) is a front view of FIG. 2(A)
Figure 3A:
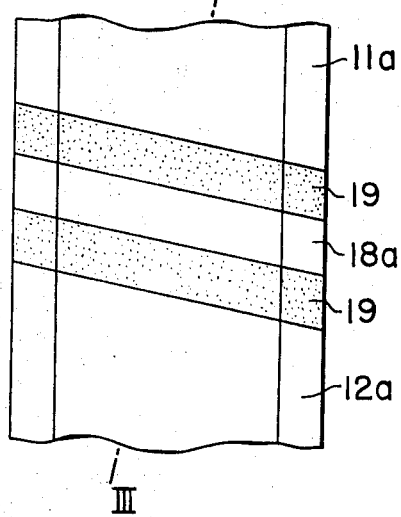
FIG.3(A) is a plan view of a part of the rotor illustrated in FIGS. 1 and 2(A), (B)
Figure 3B:
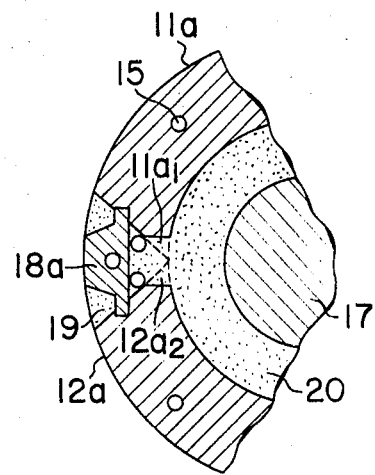
FIG. 3(B) is a sectional view along line III-III in FIG. 3(A)

An example of the synchronous machine according to the invention is illustrated in FIGS. 1 to 3. Said machine comprises a stator and, a rotor 5 and exciting means, said stator comprising an armature iron core 2 supported by a machine frame 1 and an armature winding 3 wound on said iron core 2, said rotor comprising two opposite cylinders 11 and 12, magnetic pole yokes 13 and 14 which are respectively unified with the cylinders 11 and 12, and comb-shaped magnetic poles (11a, 11b) and (12a, 12b which are respectively supported by the yokes 13 and 14, and said exciting means consisting frames 9a and 9b disposed respectively near by bearing brackets 8 and exciting windings 10a and 10b supported on said frames 9a and 9b, respectively. The exciting windings 10a magnetize poles 11a and 11b, and poles 12a and 12b, to have opposite polarities. The pole 12b is not shown in FIGS. 1 to 3, but corresponds to the pole 11b. The machine is of four pole type and the poles 11a, 11b, 12a, 12b are alternately interleaved to form magnetic poles of alternate polarity when joined as shown in FIGS. 3(A) and 3(B). The rotary shaft 6 of the rotor 5 is rotatively supported by bearings 7 which are supported by respective brackets 8. The base portions of the yoke 13 are cut off to form a taper at the positions 11c and 11d between the magnetic poles 11a and 11b thereof, as clearly shown in FIGS. 2(A) and 2(B), and lower portions of both side edges 11a1, 11a2 and 11b2, or inner corners of the respective magnetic poles 11a and 11b are cut off in same extent, respectively as shown by solid arrows in FIGS. 2(A) and 2(B), and by dotted lines in FIG. 3(B). Furthermore, left end portions of the yoke 14 are cut off, in taper state, at the positions 12c and 12d between the magnetic poles 12a and 12b, and lower portions of both side edges of the respective magnetic poles 12a and 12b are similarly cut off in some extent, respectively. In FIG. 3 only one edge portion 12a2 (corresponding to 11a2) of the pole 12a is shown. The magnetic poles 11a and 11b are, respectively, provided with cooling fluid passages 15 communicated with cooling fluid passage of the rotary shaft 6. Of course, although not shown in the drawing, the magnetic poles 12a and 12b are also provided with the same passages as the holes 15. The magnetic yokes 13 and 14 confront each other at a predetermined distance. A nonmagnetic shaft 17 is inserted between said magnetic yokes, and said three members 13, 14 and 17 are shrink fitted to one another and further welded, whereby said magnetic yokes 13 and 14 are mechanically unified.

Furthermore, wedges 18 or nonmagnetic material are inserted between poles and are welded thereto as shown at 19 by using nonmagnetic material, and the space between the magnetic yokes 13 and 14 is filled with aluminum diecast 20.

According to the construction described above the distance between inner surfaces of poles of one magnetic member and the inner end of the magnetic yoke of the other magnetic member of the rotor, and between inner corners of adjacent poles, are sufficiently increased to decrease leakage flux. In this manner, it is possible to select any desired value of pole spacing without substantial decrease in the cross section of the magnetic circuit. The result of tests show that this construction reduces the leakage flux by 14 percent and increases the capacity of the machine by 30 percent.

Figure 4:
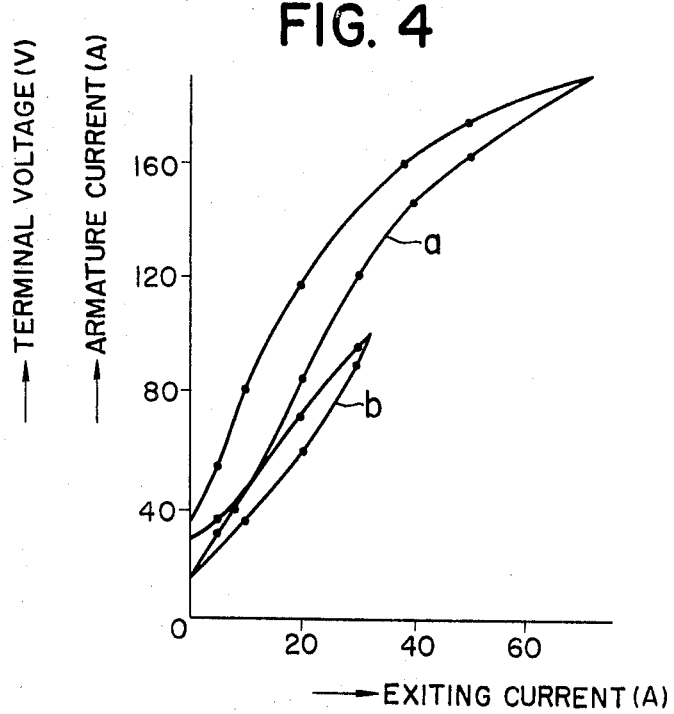
FIG. 4 shows characteristic curves showing iron loss characteristic of the motor according to the invention and a conventional motor.

FIG. 4 shows performance characteristics of a synchronous motor according to the example of FIGS. 1 to 3, said motor being designed for the following specification.

| | |
|---|---|
| Rated output | 20 kw. |
| Rated voltage | 140 V. |
| Rated current | 88 A. |
| Rated rotational speed | 20,000 r.p.m. |
| Cooling type | Normal type |

In FIG. 4, the exciting current is represented by the abscissa, and the armature current and terminal voltage are represented by the ordinate, $a$ is a no-load saturation curve, and $b$ is three phase short circuit characteristic curve. In the construction of the synchronous machine provided with comb-shaped magnetic poles, it is generally necessary that axial length of the magnetic pole surface be larger than the thickness of the laminated armature iron core, as shown in FIG. 1. Due to the dense magnetic coupling between the coil ends of the armature winding and end portions of the poles, the leakage reactance of the armature winding increases, thus decreasing the efficiency of the machine. According to the invention, as shown in FIG. 1, the outer diameter of the portions of the magnetic poles projecting from the end faces of the armature iron core is made to be smaller than that of the other portion of the magnetic poles, whereby the coil ends of the armature winding 3 are sufficiently separated from the rotor ends, thereby to decrease the leakage reactance of the armature winding, thus increasing the terminal voltage in the case of a generator, and increasing the output of the machine in the case of a motor. Particularly, in the case of a brushless motor using thyristors, commutation inductance is decreased by a quantity corresponding to the decrease in the leakage reactance whereby the commutation limit of the SCR invertor is extended, thereby to increase the output.

The above-mentioned diameter reduced portion of the magnetic poles may be effectively used for attaching nonmagnetic shield members 21 thereto as shown in FIG. 1 by dotted line, whereby leakage of the cooling fluid can be effectively prevented. The nonmagnetic shield members 21 can be attached by welding.

Figure 5:
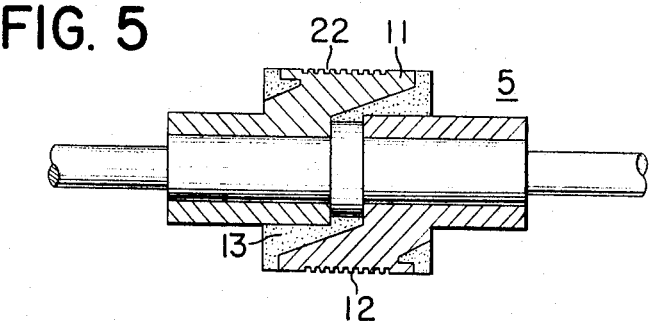
FIG. 5 is a schematic elevational view, in vertical section, of a modification of the rotor of the machine according to the invention.

Furthermore, according to the invention, the rotor of the synchronous machine provided with comb-shaped magnetic poles can be improved by providing a plurality of circumferential grooves 22 on the periphery of the rotor, as shown in FIG. 5, in which the structure of the machine is schematically shown.

According to the provision of the grooves 22, eddy current occurring on the surface of the rotor can be effectively suppressed and the cooling effect is increased due to increase of the surface area of the rotor, whereby iron loss and heat retention in the rotor can be decreased, thus causing temperature decrease of the rotor and increase of the output.

Figure 6:
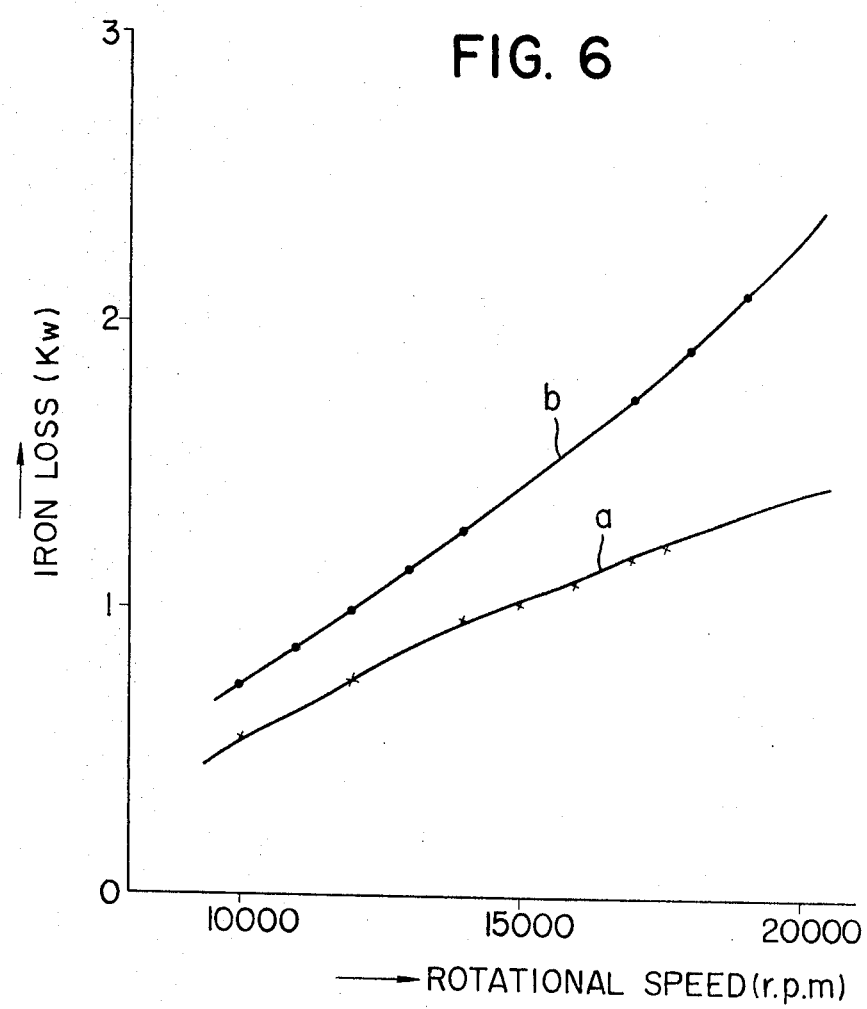
FIG. 6 is characteristic curves showing relation between iron loss and rotary speed of a machine utilizing the rotor illustrated in FIG. 5 and that of a conventional machine.

FIG. 6 shows characteristic curves of the synchronous motor according to the invention, which is connected to an AC source to operate as a DC brushless motor of 20 kw. through semiconductors such as SCR's. In FIG. 6, the curve $a$ shows the relation between iron loss and rotational speed in the case of the motor provided with the grooves 22, and the curve $b$ represents that in the case of the motor provided with no grooves 22. As is clear from the curves $a$ and $b$, the iron loss can be remarkably decreased by providing the grooves 22 on the surface of the rotor.

We claim:
1. In an improved synchronous machine including a stationary armature and a rotor having a shaft fixed thereto; two opposite magnetic members, each said magnetic member including a magnetic cylinder mounted on the rotor shaft, a plurality of axially projecting poles, a magnetic yoke interconnecting said cylinder and said poles; said poles of said two magnetic members being alternately interleaved to form magnetic poles of alternate polarity; wherein the improvement comprises: first tapered cutout portions on said yokes, said first tapered cutout portions on each said yoke being disposed between its poles and inclined outwardly in the direction opposite the projecting direction of its poles; and, second tapered cutout portions on each said pole, said second tapered cutout portions being disposed along the axial and circumferential inner edges of each said projecting pole.

2. An improved synchronous machine as set forth in claim 1, in which a portion of the outer surface of each said pole extends axially outside of said armature, said extending portion of each said pole having a reduced diameter.

3. An improved synchronous machine as set forth in claim 1, in which a nonmagnetic wedge is welded between a pair of adjacent poles, thereby joining together opposite magnetic members.

4. An improved synchronous machine as set forth in claim 1, in which said two yokes have aluminum die cast material therebetween.